(12) United States Patent
Chaillout et al.

(10) Patent No.: US 7,851,968 B2
(45) Date of Patent: Dec. 14, 2010

(54) OPTIMIZED ENERGY CONVERSION DEVICE

(75) Inventors: Jean-Jacques Chaillout, Saint-Etienne-de-Crossey (FR); Ghislain Despesse, Saint-Egreve (FR); Thomas Jager, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 40 days.

(21) Appl. No.: 11/997,217

(22) PCT Filed: Jul. 28, 2006

(86) PCT No.: PCT/EP2006/064774
§ 371 (c)(1),
(2), (4) Date: Jan. 29, 2008

(87) PCT Pub. No.: WO2007/012663
PCT Pub. Date: Feb. 1, 2007

(65) Prior Publication Data
US 2008/0238244 A1 Oct. 2, 2008

(30) Foreign Application Priority Data
Jul. 29, 2005 (FR) .................................. 05 52385

(51) Int. Cl.
*H02N 1/00* (2006.01)
*F03B 17/06* (2006.01)
*B81B 7/02* (2006.01)
*H02N 3/00* (2006.01)
*H01L 41/09* (2006.01)

(52) U.S. Cl. ...................... 310/309; 310/308; 360/264.4
(58) Field of Classification Search ................. 310/308, 310/309, 909; 360/294.4
See application file for complete search history.

(56) References Cited

U.S. PATENT DOCUMENTS 3,107,326 A 10/1963 Denholm (Continued)

FOREIGN PATENT DOCUMENTS

JP 58-29379 2/1983

(Continued)

OTHER PUBLICATIONS

Scott Meninger, et al., "Vibration-to-Electric Energy Conversion", International Symposium on Low Power Electronics and Design, XP010355950, Aug. 16-17, 1999, pp. 48-53.
Yasufusa Tada, "Experimental Characteristics of Electret Generator Using Polymer Film Electrets", Japanese Journal of Applied Physics, XP000323150, vol. 31, No. 3, Mar. 1992, pp. 846-851.
Justin Boland, et al., "Micro Electret Power Generator", International Micro Electro Mechanical Systems Conference, XP010637028, conf. 16, Jan. 19, 2003, pp. 538-541.

(Continued)

*Primary Examiner*—Quyen Leung
*Assistant Examiner*—Terrance Kenerly
(74) *Attorney, Agent, or Firm*—Oblon, Spivak, McClelland, Maier & Neustadt, L.L.P.

(57) ABSTRACT

A variable capacitance device including at least one first fixed electrode and a second electrode free to move with respect to the fixed electrode, each electrode including a body and protuberances projecting from at least one face of the body. Each electrode is arranged such that the faces of each electrode provided with the protuberances are facing each other, the distance separating the two faces facing each other being greater than the sum of the heights of a protuberance from the fixed electrode and a protuberance from the mobile electrode. The electrodes are capable of moving with respect to each other in two parallel planes along at least one main direction.

16 Claims, 4 Drawing Sheets

U.S. PATENT DOCUMENTS

| | | | |
|---|---|---|---|
| 4,814,657 A | | 3/1989 | Yano et al. |
| 5,780,948 A | * | 7/1998 | Lee et al. ................... 310/81 |
| 5,889,389 A | | 3/1999 | Bothra et al. |
| 5,998,906 A | * | 12/1999 | Jerman et al. ............. 310/309 |
| 6,611,178 B1 | * | 8/2003 | Kawakatsu et al. ........ 331/154 |
| 7,161,274 B2 | * | 1/2007 | Tsuboi et al. .............. 310/309 |
| 2002/0021055 A1 | * | 2/2002 | Lee et al. ................... 310/309 |
| 2003/0102771 A1 | * | 6/2003 | Akiba et al. ............... 310/309 |
| 2003/0102772 A1 | * | 6/2003 | Hartwell .................... 310/309 |
| 2004/0065912 A1 | * | 4/2004 | Liu et al. .................... 257/296 |
| 2004/0135466 A1 | * | 7/2004 | Higuchi ...................... 310/309 |
| 2004/0212195 A1 | | 10/2004 | Marek et al. |
| 2005/0118403 A1 | * | 6/2005 | Anazawa et al. ........... 428/209 |
| 2005/0224916 A1 | * | 10/2005 | Musalem et al. ........... 257/595 |
| 2006/0131988 A1 | * | 6/2006 | Fasen ......................... 310/309 |

FOREIGN PATENT DOCUMENTS

| | | |
|---|---|---|
| WO | WO 95/10878 | 4/1995 |
| WO | WO 03/056691 A1 | 7/2003 |
| WO | WO 03/105167 A2 | 12/2003 |
| WO | WO 2006/005886 A1 | 1/2006 |
| WO | WO 2007/006729 A1 | 1/2007 |
| WO | WO 2007/006730 A1 | 1/2007 |
| WO | WO 2007/006731 A1 | 1/2007 |

OTHER PUBLICATIONS

Shad Roundy, et al., "Micro-Electrostatic Vibration-to-Electricity Converters", Proceedings of IMECE'02 2002 ASME International Mechanical Engineering Congress & Exposition, XP002376601, Nov. 2002, pp. 1-10.

Paul D. Mitcheson, et al., "Architectures for Vibration-Driven Micropower Generators", Journal of Microelectromechanical Systems, XP001200208, vol. 13, No. 3, Jun. 2004, pp. 429-440.

Rajeevan Amirtharajah, et al., "Self-Powered Signal Processing Using Vibration-Based Power Generation", IEEE Journal of Solid-State Circuits, XP002376602, vol. 33, No. 5, May 5, 1998, pp. 687-695.

P. D. Mitcheson, et al., "Analysis of Optimized Micro-Generator Architectures for Self-Powered Ubiquitous Computers", Proceedings UBICOMP 2002, XP-002376603, 2002, 2 pages.

Masayuki Miyazaki, et al., "Electric-Energy Generation Using Variable-Capacitive Resonator for Power-Free LSI: Efficiency Analysis and Fundamental Experiment", Proceedings of the 2003 International Symposium on Low Power Electronics and Design, XP002376604, Aug. 2003, pp. 193-198.

P. Miao, et al., "Micro-Machined Variable Capacitors for Power Generation", IEEE Transactions on Very Large Scale Integration (VLSI) Systems, vol. 9, No. 1, 2001, 6 pages.

* cited by examiner

OPTIMIZED ENERGY CONVERSION DEVICE

FIELD OF THE INVENTION

The invention relates to a variable capacitor capable particularly of converting mechanical energy into electrical energy and suitable for supplying a standalone energy source for portable devices.

DISCUSSION OF THE BACKGROUND

It is known that mechanical energy, usually originating from vibrations in the external environment, can be converted into electrical energy using a variation of the capacitance between two plates.

A known type of energy conversion system comprises a usually external part fixed to a moving support, and a usually internal mobile part making a relative displacement with respect to the fixed part due to its inertia. The internal and external parts comprise interdigitised fingers forming pairs of variable capacitors. The system also comprises a flexible link between the fixed and mobile parts so as to allow their relative displacement and a converter to convert the retrieved mechanical energy into the required energy form, for example electrical energy.

The capacitance of the system varies when the fingers of the combs move. When the combs return to the equilibrium position, an electrostatic force is applied and opposes the mechanical return force that tends to bring the combs back into the equilibrium position, in other words tends to bring each finger of a comb into the middle of the space defined by two fingers of the other comb. Mechanical energy is then converted into electrical energy by electrical charge and discharge cycles on the capacitor combs. The charge may be stored with different types of management cycles. For example, a so-called <<constant voltage>> cycle for which the charge varies, or a so-called <<constant charge>> cycle for which the voltage at the capacitor terminals varies during the conversion cycle.

The efficiency of the conversion from mechanical energy to electrical energy is maximum when the intensity and variation of the electrostatic and mechanical return forces are comparable. In this case, the kinetic energy of the mobile part is practically integrally and instantaneously converted into electrical energy. The mechanical return force is traditionally proportional to the relative displacement between the mobile part and the fixed part. The electrostatic force is constant for operation at constant voltage and is proportional to the separation distance for operation at constant charge.

In devices according to prior art, the electrostatic force opposes the mechanical return force. Furthermore, if the electrostatic force is greater than the mechanical return force, the combs come into contact with each other. Therefore, the electrostatic force has to be less than the mechanical return force if a stable system is to be obtained.

Furthermore, the theoretical conversion efficiency is even better when the variation of the electrical capacitance is high during displacements of the mobile part. Since the value of a capacitor provided with parallel plates is inversely proportional to the distance between the plates, the distance separating the fixed and mobile parts has to be reduced. However, it is preferable to avoid contacts between the fixed and mobile parts to avoid possibly irreversible electrostatic sticking, abnormal mechanical wear and/ or discharge of the variable capacitor.

The article by Scott Meninger, Jose Oscar Miranda, Rajeevan Amirtharajah, Anantha Chandrakasan et Jeffrey Lang entitled <<Vibration-to-electric Energy Conversion>>, IEEE Transactions on Very Large Scale Integration (VLSI) Systems, Vol.9n) 1-2001, discloses such a converter (FIG. 7) provided with interdigitised combs, a first mobile central comb 704 and two second fixed combs 702 on each side of the mobile comb 704. The fingers of the first comb 704 penetrate into a space delimited by two corresponding fingers of one of the second combs 702.

Figure 7:
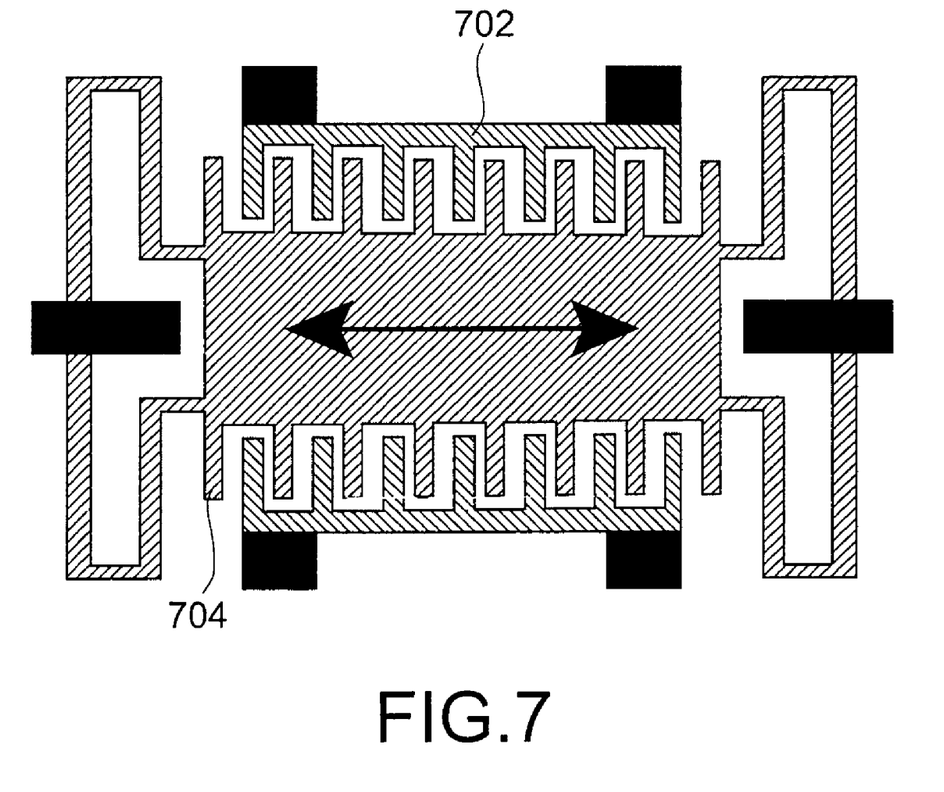
FIG. 7 is a top view of a capacitor according to the state of the art.

Movements of this converter are limited by the distance between the fingers. Furthermore, this distance is increased by a safety distance to prevent contact. As soon as this amplitude is greater than the allowable movement distance, part of the mechanical energy is lost in contact between fingers. This safety distance has to be relatively large to overcome manufacturing inaccuracies that can also cause contact, correspondingly reducing the possible variation in capacitance and therefore the conversion efficiency.

Furthermore, when at rest the fingers of a comb are in a central position between two fingers of the other comb. Thus, as soon as the movement amplitude is low compared with the distance between two adjacent fingers in the same comb, the conversion efficiency reduces strongly because the movement bringing the fixed and mobile parts towards each other is not sufficient to create a significant change in capacitance.

Furthermore, a single capacitor charge/discharge cycle occurs every time that there is any relative displacement between the mobile comb and the fixed combs. Consequently, the electrical frequency obtained is only twice the mechanical frequency. But in nature and in most instruments, most vibration frequencies are less than 100 Hz, therefore the electrical frequency obtained is too low for the electrical energy obtained to be used in compact high performance electronic systems.

Furthermore, this device is only sensitive to vibrations with a component parallel to a direction transverse to the direction of the fingers.

SUMMARY OF THE INVENTION

Consequently, one purpose of this invention is to provide an energy conversion device capable of optimising the conversion of mechanical and particularly vibrational energy, into electrical energy.

Another purpose of this invention is to provide an energy conversion device in which the risks of contact between mobile parts are avoided.

Another purpose of this invention is to provide a conversion device capable of generating electrical energy with a frequency that can be used by compact electronic systems.

Another purpose of this invention is to provide an energy conversion device in which electrostatic forces act as return forces, like the mechanical return force.

The purposes mentioned above are satisfied by a variable capacitor comprising plates free to move with respect to each other, each plate comprising protuberances projecting from at least one face, the plates being at a distance from each other such that the protuberances do not penetrate into each other.

In other words, in the case in which all protuberances of each plate are the same height, the height being the distance separating one end of a protuberance fixed to the plate from a free end of said protuberance, this height is less than the distance separating the end of said fixed protuberance of the plate from a free end of a protuberance of the other plate.

It is also possible that not all protuberances are the same height, and in this case the highest protuberance will determine the distance between the two mobile plates.

Consequently, the relative lateral movement between the plates is no longer limited by the distance separating two protuberances on the same plate, which prevents risks of contact. It is also possible to minimise the distance between the free ends of two facing protuberances, so as to optimise the electrical capacitance and therefore improve the efficiency of the conversion from mechanical to electrical energy.

The main object of this invention is then a variable capacitor device comprising at least one first fixed electrode and a second electrode free to move with respect to the fixed electrode, each comprising a body and protuberances projecting from at least one face of said body, each electrode being arranged such that the faces of each electrode provided with protuberances are facing each other, the distance separating the two faces facing each other being greater than the sum of the heights of a protuberance from the fixed electrode and a protuberance from the mobile electrode, said electrodes being capable of moving with respect to each other in two parallel planes along at least one main direction.

Thus, during normal operation, contacts between protuberances are avoided.

In one advantageous embodiment, at equilibrium each protuberance from an electrode is facing a protuberance from the other electrode.

In devices according to this invention, the distance separating the ends of two protuberances of two mobile electrodes adjacent to each other is less than 1 micrometer.

In a first variant embodiment, the protuberances are dome shaped.

In a second variant embodiment, the protuberances are tetrahedron shaped.

In a third variant embodiment, the protuberances are in the form of an approximately parallelepiped shaped pad.

In a first example embodiment, the first fixed electrode is shaped like a frame and the second mobile electrode is arranged inside said frame.

The mobile electrode can then advantageously be elongated in shape and comprise protuberances on both its faces, the frame forming the fixed electrode comprising protuberances on its inside faces facing the faces of the mobile electrode.

In a second variant embodiment, the device according to this invention may comprise a first fixed part comprising a plurality of elongated fixed electrodes and a part free to move relative to the fixed part carrying a large number of elongated mobile electrodes, each fixed electrode being arranged facing a mobile electrode.

Advantageously, the protuberances are located on the two opposite faces of the electrodes.

The first part may then be in the form of a frame, the fixed electrodes are fixed at one end to an inner face of a first side of the fixed frame and the electrodes are fixed at one end to an inner face of a second side of the frame parallel to the first side, and in which the mobile part is in the form of a shaft to which mobile electrodes are fixed on each side of this shaft, the mobile electrodes being inserted between the fixed electrodes.

The electrodes may extend in the form of a plate so as to create two-directional devices capable of working in at least two directions.

The protuberances are advantageously distributed in the form of a regular matrix.

The protuberances may also extend on the plates approximately in the longitudinal direction so as to form parallel beams. The beams are then advantageously inclined with respect to the main directions of displacement of the mobile comb.

In the device according to the second example embodiment, when the electrodes extend in the form of plates and comprise beams, the beams located on one side of the shaft are preferably arranged at an inclination different from the inclination of the beams on the other side of the shaft, and for example may be symmetric about the plane defined by the mobile shaft. Advantageously, this avoids having a blind direction in which the variation of capacitance would be small.

If the dimensions of the device according to this invention are nanometric, the protuberances may be formed of nanotubes.

BRIEF DESCRIPTION OF THE DRAWINGS

This invention will be better understood after reading the following description and the appended drawings in which.

For each figure, the X, Y, Z axes are shown in the form of an orthogonal coordinate system.

DETAILED PRESENTATION OF PARTICULAR EMBODIMENTS

Figure 1:
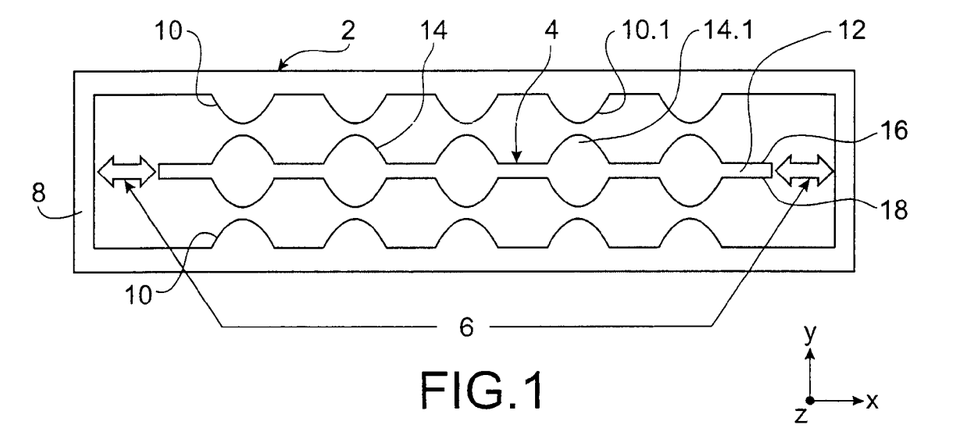
FIG. 1 is a diagrammatic top view of a first example embodiment of a capacitor according to this invention.

FIG. 1 shows a first example embodiment of a device according to this invention, comprising a first electrode 2 that can be fixed to a moving element, and a second electrode 4 free to move with respect to the electrode 2.

In the example shown, the fixed electrode 2 is approximately in the form of a rectangular frame inside which the mobile electrode 4 is placed.

The mobile electrode 4 is connected to the fixed electrode 2 by flexible connection means 6, for example elastic spring type means, and shown diagrammatically in the form of a double arrow.

The fixed electrode 2 comprises a frame 8 forming a base for protuberances 10 projecting inwards from said frame.

In the example shown, the protuberances 10 are arranged on the insides of the largest faces of the rectangle.

The mobile electrode 4 comprises an elongated body 12 comprising protuberances 14 projecting on each side of the main faces 16,18 of the body 12.

The shape of the protuberances 10,14 in the example shown are approximately the same, but different shape and different size protuberances could be used.

The protuberances 10,14 are approximately in the shape of a dome or half-disk.

The electrode 4 may have an oscillating movement around an equilibrium position, mainly in the X direction. The capacitor is then preferentially sensitive to movements in the X direction, and the capacitor is said to be single-directional.

For example, the number of protuberances 10 is equal to the number of protuberances 14 and the protuberances 10,14 are distributed similarly, each protuberance 10 then corresponding to a protuberance 14. Furthermore, advantageously, when at rest a free end 10.1 of a protuberance 10 is located facing a free end 14.1 of a protuberance 14. Thus, the distance separating the protuberances in the equilibrium position, and particularly the distance separating the free ends 10.1 and 14.1, is minimal so that energy recovery can be optimised.

Since the minimum distance between two protuberances 10,14 is reached during each movement of the electrodes 2,4, particularly of electrode 4 with respect to electrode 2, regardless of its amplitude, energy recovery is better for small amplitude movements. Furthermore, this conversion is optimised each time because the maximum value of the capacitance, or the minimum distance between protuberances, is reached during each movement. In the case of a classical capacitor, this maximum capacitance is only reached for movements with a determined amplitude, which is less than the distance between two protuberances.

Furthermore, since the risk of contact is very low, a contact can only occur in the case of an atypical movement, no mechanical stop need to be provided to prevent contact between the protuberances, and the minimum distance between the free ends of two facing protuberances can be made very small. As already stated, this makes it possible to very significantly increase the efficiency of energy conversion.

Furthermore, a capacitor for which the distance between two facing protuberances is very small can operate with lower electrical voltages for the same recovered energy.

This minimum distance may be less than one micron, for example it may be 0.1 µm. Such distances also have the advantage that new forces can be used, for example Casimir or Van des Walls forces that occur at this scale, and that can further increase the conversion efficiency.

Furthermore, the movement of one electrode with respect to the other is no longer limited by the distance between two protuberances, because the protuberances do not include a facing part in the direction of displacement of the electrodes.

It is then possible to plan that the amplitude of mobile electrode movements should be greater than a distance between two protuberances. Thus during a movement, a free end of one protuberance pass in front of several free ends of protuberances of the other electrode. It is then possible to have a mobile electrode with displacements independent of the structure of the capacitor. The structure according to this invention allows the mobile electrode to have a wide displacement range in terms of frequency and amplitude. These displacements will then be sufficient to obtain high electrical frequencies and/or a high conversion rate, for example.

The mobile electrode moves at the same frequency as the excitation frequency, but with an amplitude higher than the amplitude of a capacitor with interdigitised fingers, which leads to a large variation in capacitance and therefore improves the efficiency of energy conversion.

Thus, by optimising the pitch between two protuberances, and particularly by choosing it to be less than the displacement amplitude of the mobile electrode relative to the fixed electrode, the electrical frequency obtained can be higher than the vibration frequency that caused movement of the electrode 4.

Mechanical energy is converted to electrical energy whenever a protuberance on the mobile part is facing a protuberance on the fixed part, which may not be the same protuberance that it faces when it is at rest. Thus, energy conversion is distributed on several protuberances, and the electrical frequency is then proportional to the number of protuberances encountered which can be chosen to obtain the required electrical frequency.

Furthermore, since the transfer of electric charge is broken into fractions, the working electrical voltage of the capacitor is lower.

The energy stored in the capacitor is extracted by an appropriate state of the art energy extraction circuit, well known to those skilled in the art.

Figure 2:
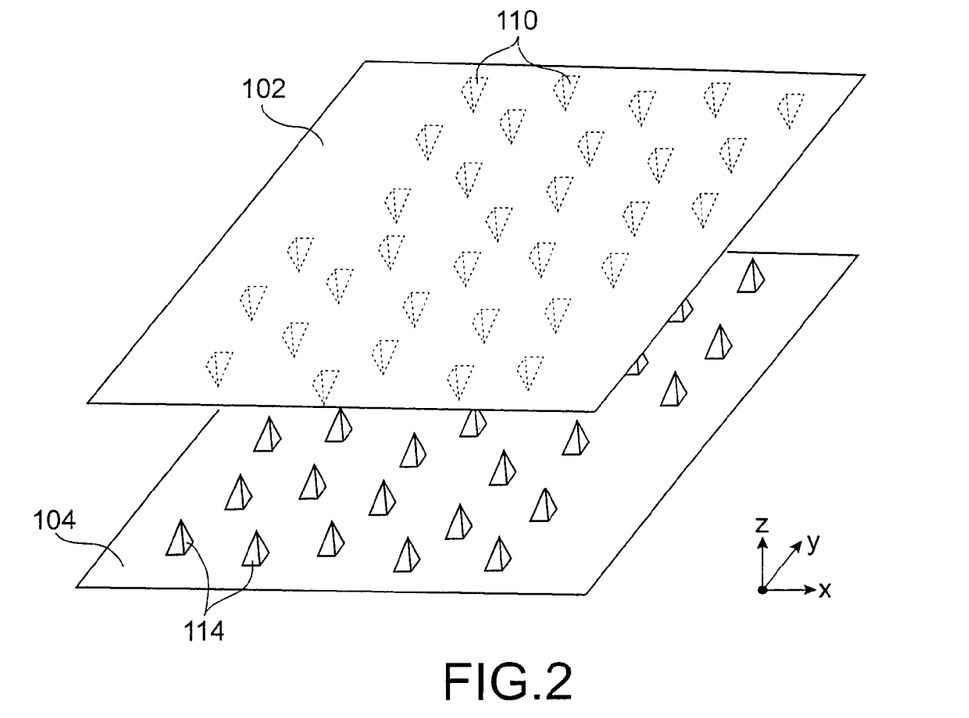
FIG. 2 is a perspective view of a second example embodiment of a device according to this invention.

FIG. 2 shows a so-called two-directional capacitor, in other words that is sensitive to movements along the two directions X and Y. The electrode 104 can move around an equilibrium position along the X direction and along the Y direction.

In the example shown, the electrodes 102,104 are in the form of a plate and the protuberances 110,114 are in the form of a tetrahedron and they are uniformly distributed on the electrode 102 and the electrode 104 in matrix form.

However, it would be possible to provide protuberances with any other appropriate shape. The protuberances may also be of the same size and shape or have different sizes and shapes, which is particularly advantageous when it is required to braking of the mobile part. The electrostatic force depends on the distance between the protuberances; if this distance varies (due to different height of protuberances on the same electrode) then the force will vary so that, for example, the braking force can be increased when the displacement amplitude increases.

It is also possible for the distribution to be non-uniform over the entire area of the electrode. As for different height protuberances, the non-uniform distribution of protuberances can increase braking of the mobile part. The frequency of the charge/discharge cycles can be varied by reducing the distances between protuberances on electrodes in areas concerned by large displacements.

It would also be possible to design a conversion system comprising several capacitors arranged in parallel that are then distributed in parallel planes with an alternation of fixed electrodes and mobile electrodes, the electrodes then advantageously having protuberances on their two main faces.

Figure 3:
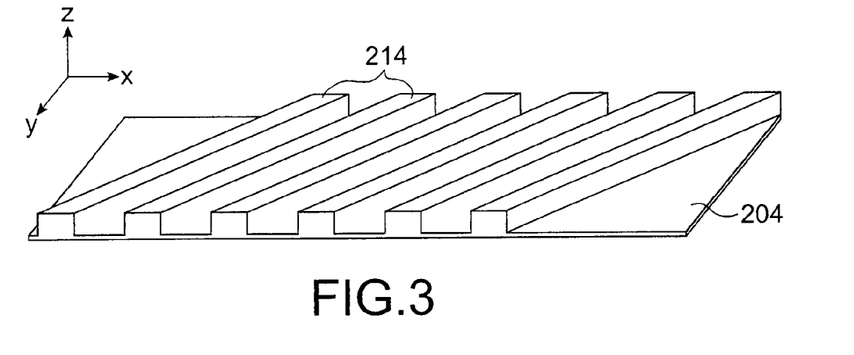
FIG. 3 is a partial view of a third example embodiment of a capacitor according to this invention.

FIG. 3 shows another example embodiment of an electrode 204 that can be used in a two-directional capacitor in which the protuberances 214 are in the form of a right-angled parallelepiped. In the example shown, the protuberances 210 are parallel to each other, their longitudinal axis advantageously being inclined from the X and Y axes forming the main displacement directions, to obtain a variation in the facing surfaces.

If the protuberances were elongated along the Y direction, an electrode moving along the Y direction would only see a small variation in the distance of facing protuberances.

The facing electrode may have an identical or a different shape.

If the facing electrode is identical, in other words if the protuberances are in the same direction, the protuberances are advantageously facing each other at rest. Thus, a movement of one of the two electrodes in a plane parallel to the XY plane modifies the value of the variable capacitance.

It is even possible to obtain a capacitor sensitive to three directions X, Y et Z, if at least one of the electrodes can be displaced along the Z direction.

The protuberances may have any other shape, for example triangular or semi-circular.

The electrostatic force generated by relative displacement of the electrodes in a variable capacitor tends to oppose the mechanical return force of the system, for example applied by springs connecting the fixed part to the mobile part.

In the device according to this invention, the generated electrostatic force tends to bring the device into its equilibrium position, in the same way as the mechanical return force. Thus, the two forces contribute to the stability of the assembly and damping of the movement of electrodes with respect to each other, which means that the resonant frequency can be adjusted.

There is then no longer any need to make sure that the electrostatic force is less than the mechanical return force.

It is then also possible to control variations of the electrostatic force and/or make it dependent on the amplitude of the displacement between the mobile electrode and the fixed electrode, by choosing an appropriate shape of protuberances that creates an electrostatic force that increases with the displacement amplitude and therefore, in a way, leads to a resonant frequency that also increases with the amplitude.

The simplified model described below can be used to calculate the variation of the electrostatic force or the capacitance of a capacitor.

Figure 6A:
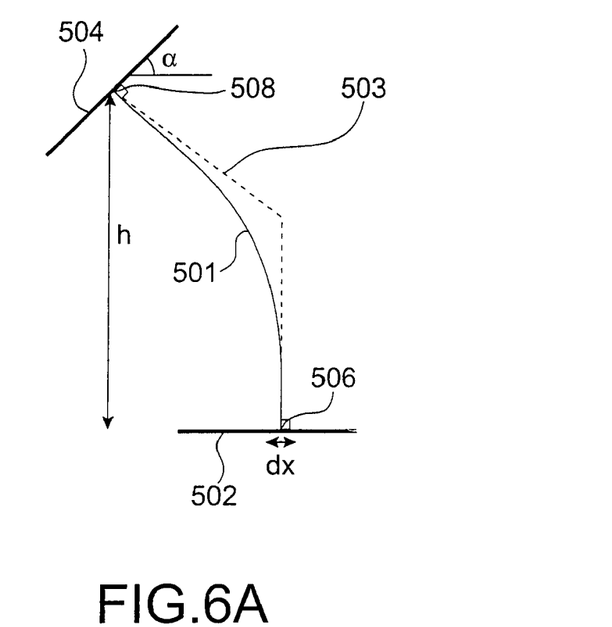
FIG. 6A is a diagrammatic view of field lines between the two plates of a capacitor.

FIG. 6A shows an electric field line 501 connecting two portions of two conducting plates 502, 504 forming an angle a between them, the portions being located far from a plate edge. A broken line 503 composed of two equal length segments, each being orthogonal to one of the portions of the plate, is tangent to the field line 501 at the ends 506, 508 of the field line.

Since there is zero divergence of the electric field between the plates, we will assume that the curvature of the field line is uniform and therefore that the length $z_1$ of the broken line 503 provides a good approximation of the length of the field line. h is the distance between the two plates, taken along a direction orthogonal to the plate 502.

$$\text{Thus } z_1 = \frac{2h}{1 + \cos\alpha} \qquad (I)$$

Furthermore, since the differential capacitance between these two plate portions is inversely proportional to the length $z_1$ that depends on the position along the X axis, the total capacitance between the two plates is the curved integral along the plate 502:

$$dC = \frac{kdx}{z1(x)} \text{ where } C = k\int \frac{dx}{z_1(x)}.$$

All magnitudes k, K are multiplication factors that can be understood without defining magnitudes.

The electrostatic force is then obtained by calculating the derivative of the electrostatic energy during a displacement. To simplify the presentation and without restricting the general case, we will consider operation at constant charge Q of the capacitor applied to the structure in FIG. 6B for which the displacement is colinear with the spacing between the plates.

Figure 6B:
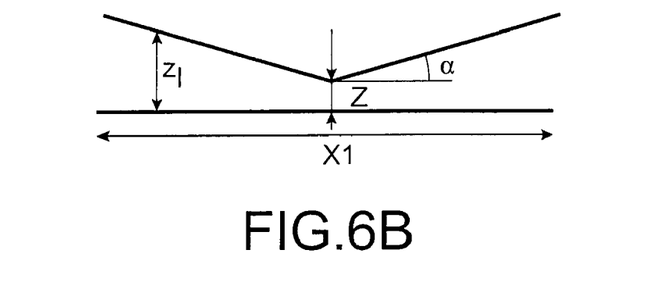
FIG. 6B is a diagrammatic view of a capacitor provided with a plate with a tip.

The electrostatic force can then be written:

$$f_e = \frac{d\left(\frac{Q^2}{2C}\right)}{dz} = \frac{Q^2}{2C^2}\frac{d(C)}{dz} = K_e \frac{1}{C^2}\frac{d(C)}{dz} \qquad (II)$$

When the two plates are plane, parallel and have a length X1 along the x direction and are spaced at a distance Z, which is a typical form (α=0), the developed model actually provides a capacitance inversely proportional to the distance between the plates and a constant electrostatic force, In this case, starting from (I), $z_1$=Z, $$dC = \frac{kdx}{Z}, \text{ therefore } C = \frac{kX1}{Z}.$$

We obtain $f_e$ by using formula (II) and we obtain a constant $f_e$.

Therefore, it seems that this model is representative of the physical phenomenon.

In the case of a capacitor for which one of the plates comprises a tip (α≠0) (FIG. 6B), the calculations give the following results:

$z_1$=Z +x tan α (where x is the position of the tip)

$$C = k\frac{1+\cos\alpha}{2tg\alpha}\ln\left(\frac{Z+X1tg\alpha}{Z}\right) \Rightarrow \frac{d(C)}{dz} = k\frac{1+\cos\alpha}{2Z(Z+X1tg\alpha)} \qquad (III)$$

$$f_e = k\frac{4tg\alpha^2}{1+\cos\alpha} \times \frac{1}{2Z(Z+X1tg\alpha)\left[\ln\left(\frac{Z+X1tg\alpha}{Z}\right)\right]^2}$$

It is then observed that the electrostatic force is no longer constant but decreases with the distance Z between the plates. For example, for an angle α=10° and a length X equal to 200 μm, formula (II) gives an electrostatic force that is divided by a factor of 35 when the plates move apart from 1 μm to 100 μM. The model thus produced models the electrostatic force in the case of separating displacements of a plate provided with a tip and a plane plate. This displacement is similar to the displacement of two plates on which tips are fitted along two parallel planes, in accordance with this invention.

This example shows that structuring the plates of the variable capacitor enables control over variations of the capacitance and the electrostatic force applied between the plates of a capacitor. For example, while there is no variation in the electrostatic force adapted to energy recovery at constant voltage with the traditional structure, and structuring the capacitive faces enables use of the electrostatic force for energy recovery.

The capacitors shown in FIGS. 1 to 3 can be combined with a two-dimensional (plane) or three-dimensional geometry.

Figure 4:
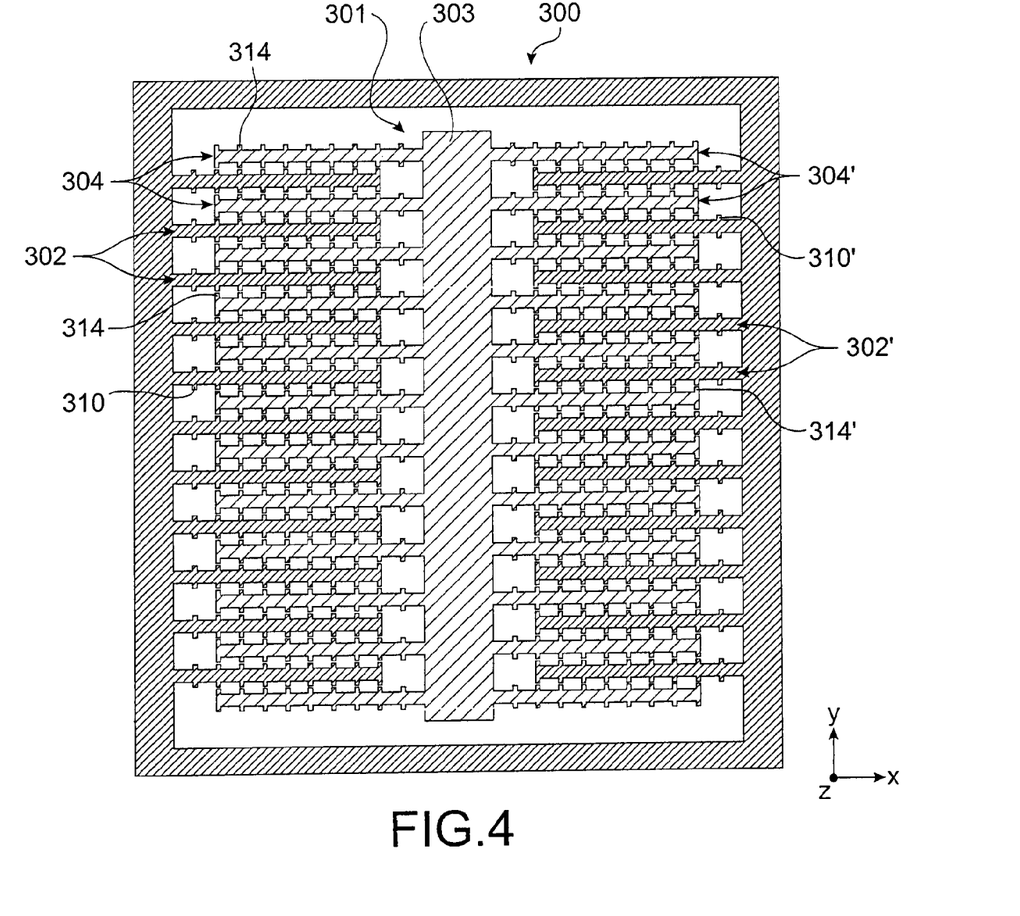
FIG. 4 is a top view of an energy conversion device according to this invention comprising several capacitors according to this invention.

FIG. 4 shows an example energy recovery device combining several capacitors according to this invention.

The device comprises an external part 300 forming a fixed frame and an inside part 301 capable of displacement relative to the frame 300.

The frame 300 comprises a plurality of first electrodes 302 parallel to a first longer side of the frame 300 and fixed to it at a longitudinal end, and a plurality of second electrodes 302' parallel to a second longer side of frame 300 and fixed to it at longitudinal end.

In the example shown, the electrodes 302,302' are perpendicular to the longer sides and each electrode 302 is aligned with an electrode 302'. But this configuration is not limitative. For example, electrodes 302,302' inclined from the longer sides and electrodes 302,302' offset along the Y axis could be provided.

The second part 301 comprises a central shaft 303 from which electrodes 304,304' start approximately perpendicular to the centre line of the shaft 303, on each side of the arm. One electrode 304 is aligned with an electrode 304', but once again this arrangement is not limitative.

The electrodes 302,304 are interdigitised, and the electrodes 302',304' are interdigitised.

Each electrode 302,302',304,304' comprises projecting protuberances 310,310',314,314' respectively, as described above with reference to FIG. 1.

In the example, the protuberances are shown in the form of a rectangle. Advantageously, in the equilibrium position, each protuberance of an electrode has a protuberance on a facing electrode, which optimises the energy recovery efficiency as explained above.

Elastic return means are provided (not shown) connecting the frame 300 and the part 301.

The second part 301 can be displaced principally along the X direction.

Thus, the displacement amplitude between the electrodes 302,304 and 302',304' is no longer limited by the space between the protuberances.

This amplitude is now limited by the distance separating one end of an electrode 302,302' with the shaft 304 and/or the distance separating the end of an electrode 304,304' with a large side of the frame 301. The order of magnitude of these distances is of the order of several millimetres, while in a device according to the state of the art, the limiting distance is of the order of about a hundred microns.

As described above, by choosing a pitch between protuberances less than the movement amplitude of the mobile part 301, the result obtained is an electrical frequency that is a multiple of the mechanical oscillation frequency and that is better adapted to electronic systems with optimised dimensions.

Figure 5:
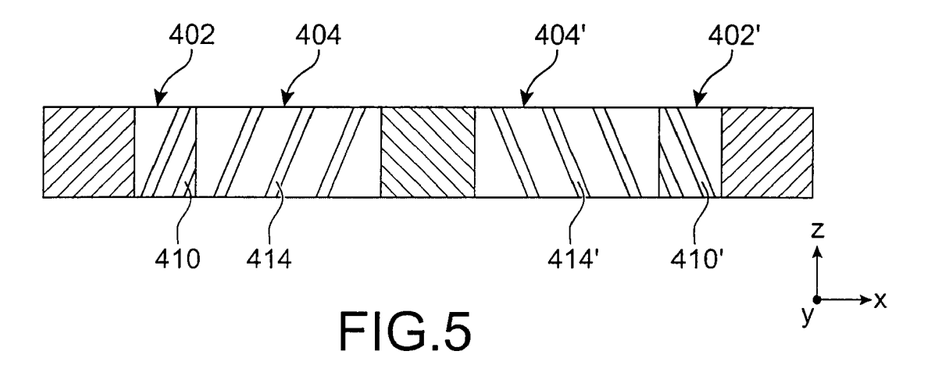
FIG. 5 is a sectional view of a three-dimensional variant embodiment of the device in FIG. 4 in a plane orthogonal to the Y axis.

The following table contains a comparison between the characteristics of a capacitor according to the state of the art (FIG. 7) and the energy recovery device in FIG. 5 with the same overall dimensions.

|  | State of the art (FIG. 7) | Invention (FIG. 5) |
|---|---|---|
| Outside dimensions | 8 mm × 22 mm | 8 mm × 22 mm |
| Protuberance width | 26 μm | 1 μm |
| Protuberance height | 1 mm | 1 mm |
| Width of the silicon structure | 400 μm | 400 μm |
| Moving mass | 2.1 g | 2.1 g |
| Movement amplitude | 95 μm | 300 μm at 25 Hz |
| Maximum voltage | 313 V | 10.2 V |
| Electrical frequency | 100 KHz | 3750 KHz |
| Maximum recoverable power | 63 μW at 50 Hz* | 70 μW at 25 Hz* |

*Mechanical frequency

It can be seen that the electrical frequency is very much higher than the electrical frequency of a conventional device and that it can be used by more compact electronic control systems.

Furthermore, the recoverable power is approximately the same as the power that can be recovered with the device according to this invention, however the charge voltage is only 10.2V compared with 313V for a device according to prior art.

The device in FIG. 5 is of the single-directional type, however it can be made two-directional if the electrodes 302,302',304,304' are made to extend along the Z axis, said electrodes comprising a succession of protuberances distributed over the entire surface of the electrode extending along a plane parallel to the XZ plane.

Electrodes with the structure of the electrode shown in FIG. 3 can also be used. Facing electrodes are identical, in other words the elongated protuberances are oriented along the same direction inclined from the X and Z axes.

The inclination of each pair of facing electrodes may be different from the inclination of other pairs of protuberances on the faces of the facing electrode.

FIG. 5 shows a sectional view on a plane orthogonal to the Y axis of a two-directional device according to FIG. 4.

In the example shown, the protuberances 410,414 of the electrodes 402,404 are symmetrical with the protuberances 410',414' of the electrodes 402',404' about a plane parallel to the YZ plane, thus the device does not contain any blind displacement direction in the XZ plane, in other words directions in which there is no or little variation in capacitance.

In the case in which the orientation of all the protuberances is determined and is the same, if the mobile part 404 is displaced along this determined direction, this displacement causes a small variation in capacitance, because the distance between the facing protuberances only changes slightly.

In the case shown in FIG. 5, if the mobile part moves along the determined direction, the protuberances on the right part in FIG. 5 are oriented along another direction, and these will cause a greater variation in capacitance. The configuration shown in FIG. 5 creates an optimum capacitance variation as a function of the displacement of the mobile part.

The orientations of the protuberances 402,404 and 402',404' do not necessarily have to be symmetrical.

Electrodes according to this invention may for example be made by machining such as spark erosion, milling, turning, etc., or gluing, or the protuberances can be transferred onto a substrate, the material from which the protuberances are made possibly being the same as the material used for the substrate, or may be a different material.

These electrodes can also be made using microtechnological processes such as material growth, etching, chemical attack.

Furthermore, when the size of protuberances is of the order of a nanometre, it is also possible to use carbon nanotubes obtained by transfer, growth or any other type of process to make the protuberances.

The invention claimed is:

1. A variable capacitance device comprising:
   at least one first fixed electrode; and
   at least one second mobile electrode free to move with respect to the fixed electrode along at least one main direction of displacement;
   each electrode comprising a conductive body having a plate shape and conductive protuberances projecting from at least one face of the body, each electrode arranged such that the faces of each electrode provided with the protuberances are facing each other, the distance separating the two faces facing each other being greater than the sum of the heights of a protuberance from the fixed electrode and a protuberance from the mobile electrode;

the protuberances being parallelepiped-shaped beams, parallel to each other, and the protuberance being inclined with respect to the at least one main direction of displacement;

the second mobile electrode configured to move mainly in a plane parallel to a plane of a body of the fixed electrode and laterally with respect to the at least one first fixed electrode.

2. A device according to claim 1, in which at equilibrium, each protuberance from an electrode is facing a protuberance from the other electrode.

3. A device according to claim 1, in which the distance separating ends of two protuberances of two second electrodes adjacent to each other is less than 1 micrometer.

4. A device according to claim 2, in which the distance separating ends of two protuberances of two second electrodes adjacent to each other is less than 1 micrometer.

5. A device according to claim 1, in which the first fixed electrode is shaped as a frame and the second electrode is arranged inside the frame.

6. A device according to claim 5, in which the second electrode is elongated in shape and comprises protuberances on both its faces, the frame forming the first fixed electrode comprising protuberances on its inside faces facing the faces of the second electrode.

7. A device according to claim 1, further comprising a first fixed part comprising a plurality of elongated fixed electrodes and a part free to move relative to the fixed part carrying a large number of elongated second electrodes, each first fixed electrode being arranged facing a second electrode.

8. A device according to claim 7, in which the protuberances are carried on the two opposite faces of the electrodes.

9. A device according to claim 7, in which the first part is in a form of a frame, the first fixed electrodes being fixed at one end to an inner face of a first side of the fixed frame and the first electrodes being fixed at one end to an inner face of a second side of the frame parallel to the first side, and in which the mobile part is in a form of a shaft to which second electrodes are fixed on each side of the shaft, the second electrodes being inserted between the first fixed electrodes.

10. A device according to claim 8, in which the first part is in a form of a frame, the first fixed electrodes being fixed at one end to an inner face of a first side of the fixed frame and the first electrodes being fixed at one end to an inner face of a second side of the frame parallel to the first side, and in which the mobile part is in a form of a shaft to which second electrodes are fixed on each side of the shaft, the second electrodes being inserted between the first fixed electrodes.

11. A device according to claim 1, in which the protuberances are formed from nanotubes.

12. A device according to claim 7, in which the first part is in a form of a frame, the first fixed electrodes being fixed at one end to an inner face of a first side of the fixed frame and the first electrodes being fixed at one end to an inner face of a second side of the frame parallel to the first side, and in which the mobile part is in a form of a shaft to which second electrodes are fixed on each side of the shaft, the second electrodes being inserted between the first fixed electrodes, and the beams located on one side of the shaft are arranged at an inclination different from the inclination of the beams on the other side of the shaft.

13. A device according to the claim 12, in which the beams are symmetric about the plane defined by the mobile shaft.

14. A device according to claim 1, wherein the second mobile electrode can move in the parallel plane with respect to the fixed electrode by a distance greater than a distance between two of the conductive protuberances of the fixed electrode.

15. A device according to claim 1, wherein the second mobile electrode can move in the parallel plane with respect to the fixed electrode by a distance greater than a distance between two of the conductive protuberances of the fixed electrode.

16. A device according to claim 1, wherein the second mobile electrode is free to move along two main directions of displacement, and the protuberances being inclined with respect to the main directions of displacement.

* * * * *